UNITED STATES PATENT OFFICE.

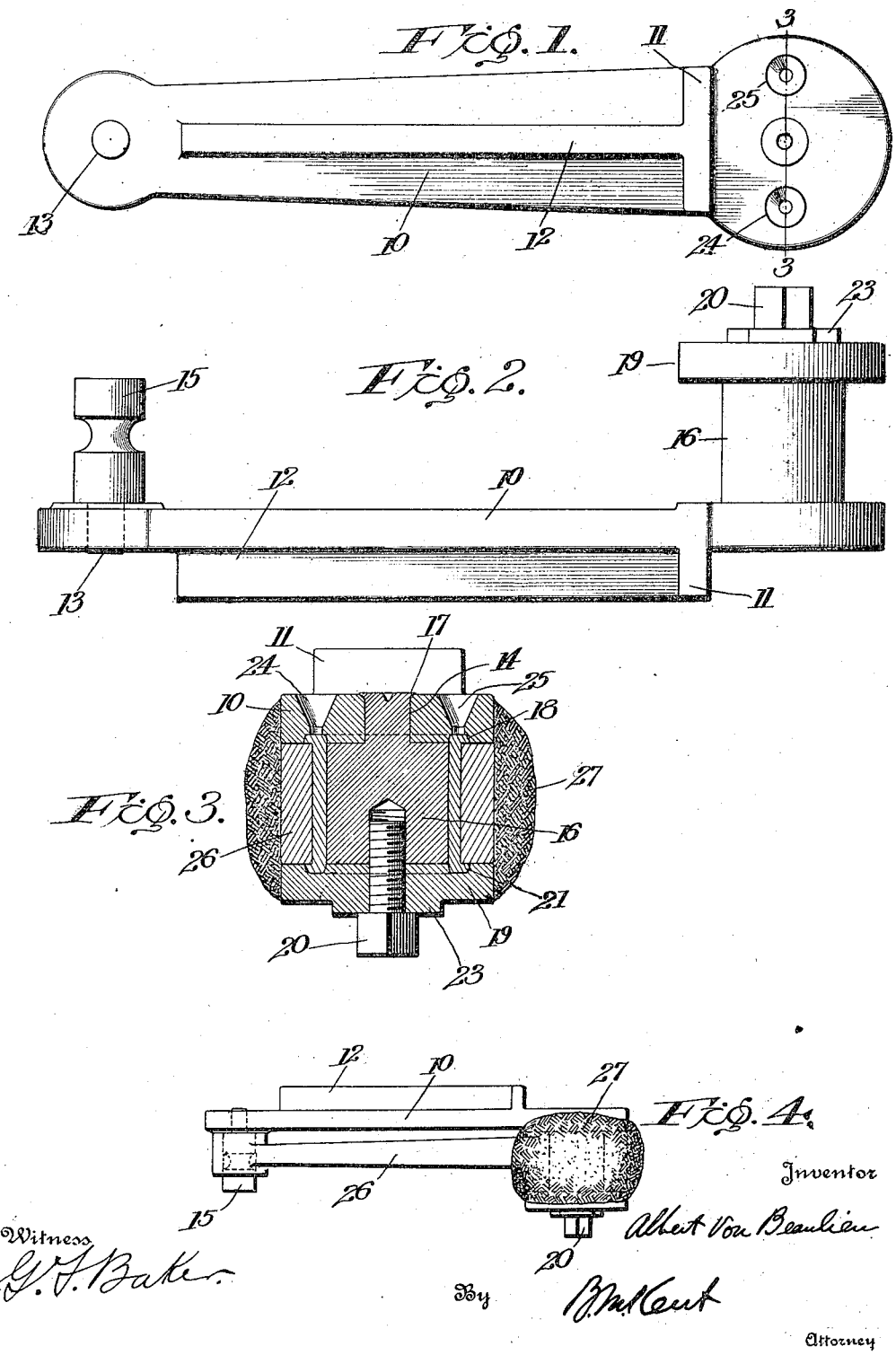

ALBERT von BEAULIEU, OF OWEGO, NEW YORK.

BABBITTING-FIXTURE.

1,269,137.   Specification of Letters Patent.   Patented June 11, 1918.

Application filed August 11, 1917. Serial No. 185,663.

*To all whom it may concern:*

Be it known that I, ALBERT VON BEAULIEU, a citizen of the United States, and a resident of Owego, county of Tioga, State of New York, have invented certain new and useful Improvements in Babbitting-Fixtures, of which the following is a specification.

This invention relates to fixtures for use in babbitting connecting rods and particularly rods for Ford automobiles.

The invention has for its principal object the provision of a fixture whereby the babbitting may be easily and accurately done at a minimum cost.

Other objects and the features of novelty will be apparent from the following description taken in connection with the accompanying drawings, of which:

Figure 1 is an inverted plan view of a fixture embodying the invention;

Fig. 2 is a side elevation of the same;

Fig. 3 is a section on the line 3—3 of Fig. 1, and including the connecting rod; and Fig. 4 is a side elevation, on a reduced scale, with the connecting rod in position and ready to receive the Babbitt metal.

Referring to the drawings, 10 indicates a frame member, one side of which is provided with ribs 11 and 12 which not only strengthen the structure but also serve as a means for supporting the fixture in position to receive the connecting rod. At the ends of the frame member 10 are openings 13 and 14, and in the opening 13 a readily removable pin 15 corresponding in size to the wrist pin bore of the connecting rod, is arranged. A pin 16, corresponding in size to the crank pin bore of the connecting rod, is rigidly secured in the opening 14 by riveting, as shown at 17 in Fig. 3. The pins 15 and 16 are accurately spaced to correspond with the spacing of the bores of the connecting rod.

A groove 18 is provided in the member 10, around the pin 16, this groove serving as a mold to form a bead or flange of babbitt on one side of the connecting rod. A circular plate 19 is detachably secured on the end of the pin 16 by means of a screw 20 and has a groove 21, similar to groove 18, and a hexagonal boss 23 adapted to receive a wrench. Openings or ports 24 and 25 are provided in the frame member 10 and communicate with the groove 18, one of these openings being used for the introduction of the Babbitt metal and the other as a vent.

When the fixture is to be used it is placed in the position shown in Fig. 2, the screw 20 and plate 19 removed, and the connecting rod 26 placed in position on the pins 15 and 16. The plate 19 and screw 20 are then replaced and the rod clamped between the frame 10 and the plate 19. The fixture is then inverted, as shown in Fig. 4, and clay or other suitable plastic material 27 applied to close the various joints and prevent leakage of the molten metal, as is well understood by those skilled in this art. The molten metal is then run into the space surrounding the pin 16, by means of either of the ports 24 or 25, the other port serving as a vent for the air. The metal is run in until it rises in the ports 24 and 25 and after it solidifies the pin 15 is removed and the connecting rod turned on the pin 16 to shear off the sprues in the ports 24 and 25. The screw 20 and plate 19 are then removed and the connecting rod taken from pin 16.

Having thus described my invention what I claim is:

1. A babbitting fixture, for connecting rods, comprising a frame member, pins, respectively corresponding in size and spacing to the wrist pin and crank pin bores of the connecting rod, secured to said frame member, a member detachably secured to one of said pins for clamping one end of the connecting rod against said frame member, and means whereby the Babbitt metal may be introduced around the last-mentioned pin.

2. A babbitting fixture, for connecting rods, comprising a frame member, pins, respectively corresponding in size and spacing to the wrist pin and crank pin bores of the connecting rod, secured to said frame member, a member detachably secured to one of said pins for clamping one end of the connecting rod, and the other of said pins being readily removable from said frame member, and one or more openings in said frame member for the introduction of the Babbitt metal.

3. A babbitting fixture, for connecting rods, comprising a frame member, pins, respectively corresponding in size and spacing to the wrist pin and crank pin bores of the connecting rod, secured to said frame member, a member detachably secured to one of said pins for clamping one end of the connecting rod, grooves surrounding the last-mentioned pin, in the member secured thereon and in said frame member, and one or more openings in said frame member communicating with the said groove therein and whereby the Babbitt metal may be introduced.

In testimony whereof I affix my signature.

ALBERT von BEAULIEU.